UNITED STATES PATENT OFFICE.

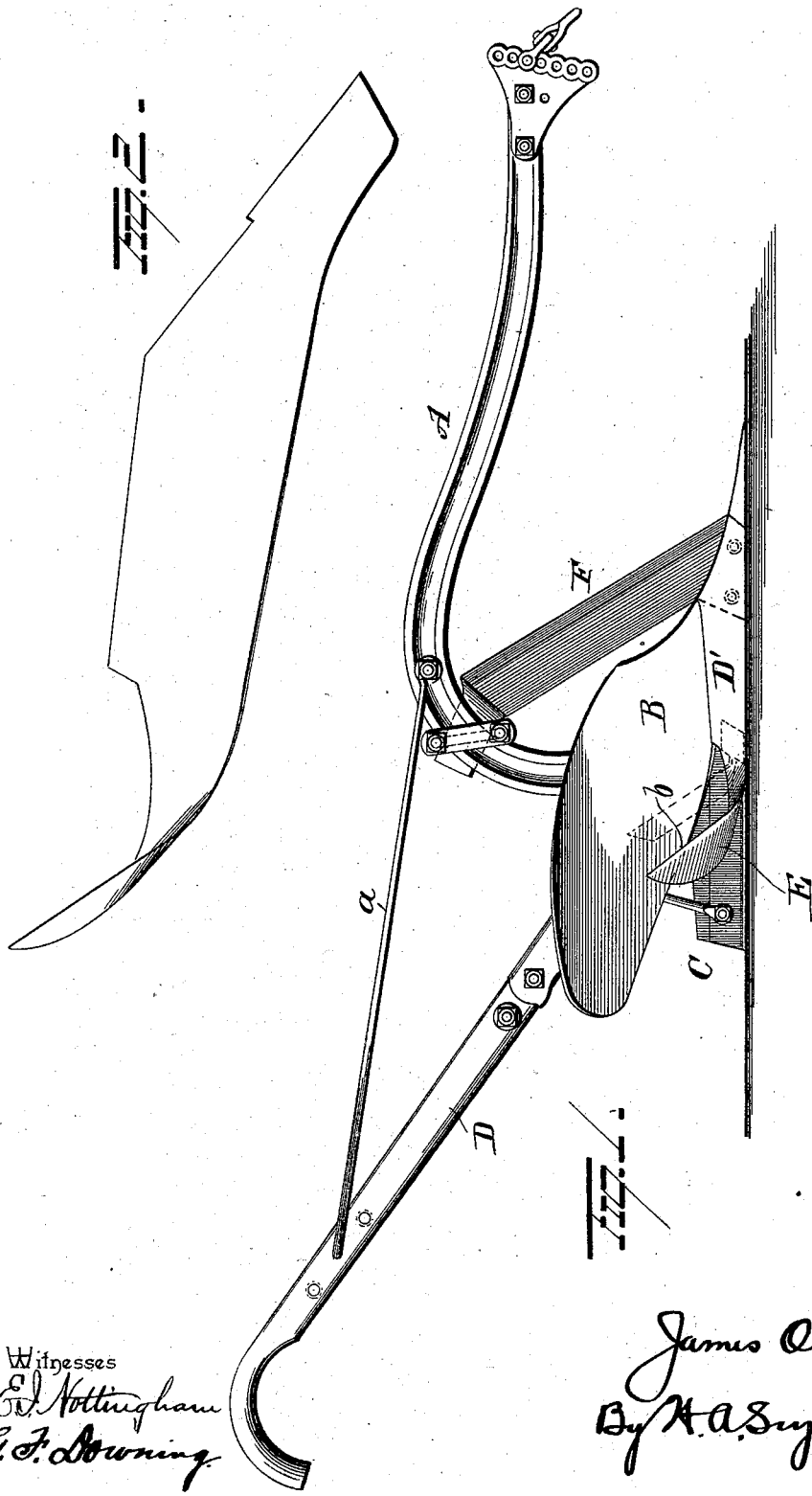

JAMES OLIVER, OF SOUTH BEND, INDIANA, ASSIGNOR TO THE SOUTH BEND IRON WORKS, OF SAME PLACE.

PLOW.

SPECIFICATION forming part of Letters Patent No. 557,999, dated April 7, 1896.

Application filed October 23, 1895. Serial No. 566,627. (No model.)

*To all whom it may concern:*

Be it known that I, JAMES OLIVER, a resident of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

My invention relates to an improvement in plows.

Heretofore much trouble has occurred in plowing in wild prairie and marsh lands where the grass and roots are so stiff and springy that they cause the furrow to roll back, in many places necessitating the presence and work of several men to follow up and force the furrow-slice down to its proper place. These difficulties make the plowing slow and expensive and the character of work done unsatisfactory.

The object of my present invention is to provide means whereby to obviate the difficulties above mentioned and to so construct a plow that it will operate successfully in marshy ground.

With this object in view the invention consists in certain novel features of construction and combinations and arrangements of parts, as hereinafter set forth, and pointed out in the claims.

In the accompanying drawings, Figure 1 is an elevation of a plow embodying my improvements. Fig. 2 is a detail view of the share.

A represents a plow-beam, having the moldboard B and landside C secured thereto, and to said moldboard and beam or standard the plow-handles D are secured and braced by means of rods $a$, connected with the beam.

To the moldboard and landside the share D' is secured, said share being so constructed that its rear end projects beyond the adjacent edge of the moldboard, the rearwardly-projecting portion E being bent upwardly and twisted and its front edge $b$ sharpened. A straight colter F is secured at its upper end to the beam and at its lower end to the share in rear of the point thereof.

From the construction and arrangement of parts above described it will be seen that the rear portion E of the share is turned up at the desired width of furrow and high enough to cut off the furrow-slice its entire depth. The cutting edge of the portion E of the share acts as a colter and in connection with the main colter F, extending from the beam to the point of the share, effectually cuts loose the furrow-slice of sod, roots, &c., and permits the same to lie down smoothly. This is all done without the additional help ordinarily required for opening land, and the work is also greatly improved in character.

My improvements are simple in construction, cheap to construct, and effectual in all respects in the performance of their functions.

The extension E may be made straight and secured to the rear portion of the share (see dotted lines, Fig. 1) or made integral therewith, as desired.

Having fully described my invention, what I claim as new, and desire to secure by Letters Patent, is—

1. In a plow, an upwardly-extending blade located on the moldboard side of the plow in position to cut the sod from underneath whereby to entirely disconnect the furrow-slice from the unplowed land, as well as turn it over, substantially as set forth.

2. In a plow, an upwardly and rearwardly inclined cutter-blade on the moldboard side adapted to cut through the furrow-slice from underneath whereby to entirely disconnect it from the unplowed land.

3. In a plow, a share having its rear end extended outwardly and rearwardly and twisted or bent to extend upwardly whereby to entirely cut the furrow-slice from the land, from underneath as the plow is drawn along, substantially as set forth.

4. In a plow, the combination with the beam, plow proper, a colter extending from the beam to the forward end of the plow proper and secured at its ends to both, and handles, of connecting-rods extending from the beam to the handles whereby in effect a continuous connection or support is had from the handles to the forward end of the plow proper, substantially as set forth.

In testimony whereof I have signed this specification in the presence of two subscribing witnesses.

JAMES OLIVER.

Witnesses:
JNO. W. HARBON,
H. GAIL DAVIS.